March 17, 1953 R. R. TEETOR 2,631,908
PISTON RING
Filed Oct. 29, 1947 2 SHEETS—SHEET 1
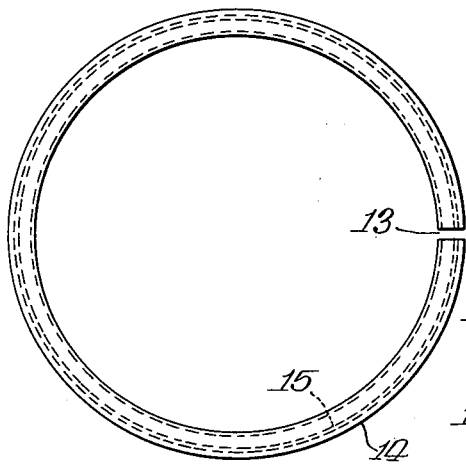
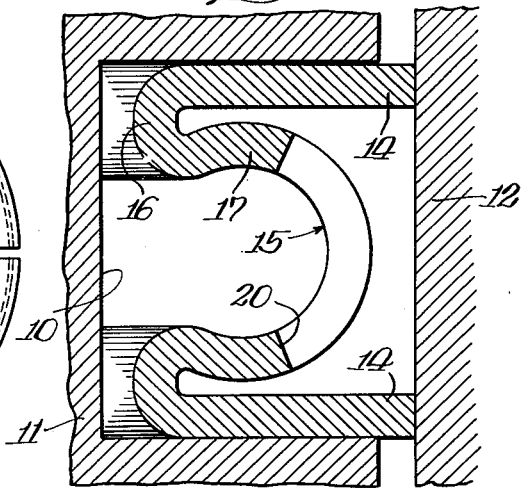
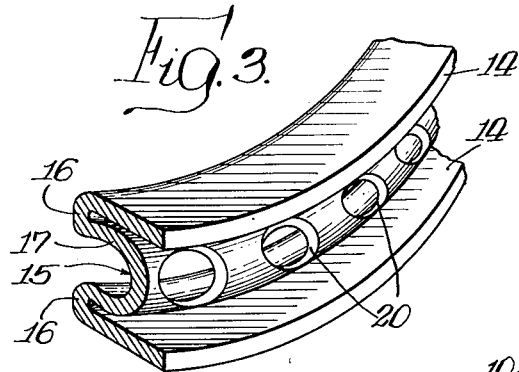
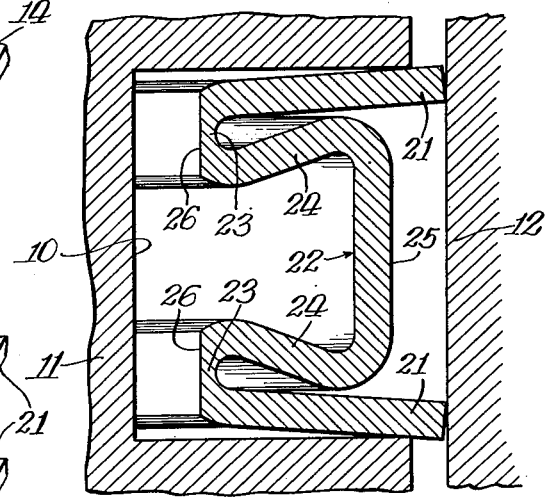
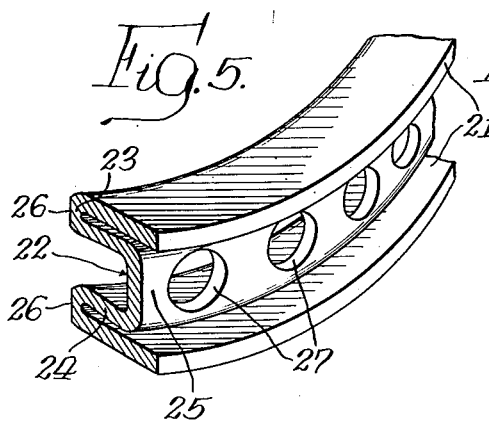
INVENTOR.
Ralph R. Teetor,
BY
Davis, Lindsey, Hibben & Noyes
Attys.

Patented Mar. 17, 1953

2,631,908

UNITED STATES PATENT OFFICE 2,631,908

PISTON RING

Ralph R. Teetor, Hagerstown, Ind., assignor to Perfect Circle Corporation, Hagerstown, Ind., a corporation of Indiana Application October 29, 1947, Serial No. 782,800

16 Claims. (Cl. 309—45)

The invention relates generally to piston rings for internal combustion engines and the like, and more particularly to a piston ring made of sheet metal.

The general object of the invention is to provide a novel piston ring made of sheet metal and capable of being manufactured at a relatively low cost.

Another important object is to provide a novel piston ring of sheet metal, which has a predetermined basic construction capable of being varied in a number of ways to obtain rings of different tension.

Other objects will become apparent from the following description taken in connection with the accompanying drawings, in which:

Figure 1 is a plan view of a piston ring embodying the features of the invention.

Fig. 2 is an enlarged radial sectional view of the ring shown in Fig. 1 and illustrating it in position in the groove in the piston and in contact with the cylinder wall.

Fig. 3 is a fragmentary perspective view of the ring shown in Fig. 2.

Fig. 4 is a view similar to Fig. 2 but showing a modified form of ring.

Fig. 5 is a fragmentary perspective view of the ring shown in Fig. 4.

Figure 6:
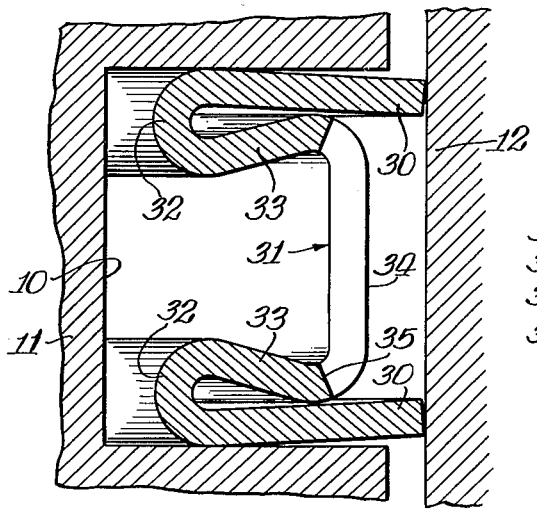
Fig. 6 is a view similar to Figs. 2 and 4 but showing another modified form of ring.

The present invention contemplates a ring which may be readily manufactured and in which by variations in portions thereof rings of different tensions may be obtained. All the forms of rings shown in the drawings are basically of the same construction, but the differences in the various modifications alter the stiffness of the ring so that rings may thereby be made to meet different operating conditions. Fundamentally, all of the rings shown in the drawings comprise strips of sheet metal bent along longitudinal lines to form a generally channel-shaped section comprising a pair of flanges connected by a web portion. The flanges at their free ends are adapted to engage the cylinder wall, and are imperforate except for their full radial width and continuous except for the gap between the ends of the ring. The web portion in the respective forms, however, is varied to provide the various ring tensions.

A ring of any one of the forms shown herein is adapted to be placed in an annular groove 10 in a piston 11, the cylinder wall being indicated at 12. Since each of the rings is made from a strip of sheet metal given its annular form by bending the strip arcuately after forming the desired cross section, a gap 13 is provided between the ends of the ring, as shown in Fig. 1.

In all the forms, as mentioned above, the cylinder-engaging flanges are imperforate and continuous except for the gap 13. The web portion, however, may be structurally weakened by removal of metal therefrom to give a desired flexibility to the ring. Where a very stiff ring is required, the amount of metal used to form the web may be increased to give the added stiffness.

In the form of ring shown in Figs. 1, 2 and 3, a strip of metal of the desired thickness and necessary width is bent along longitudinal lines and then arcuately into its annular form to provide a ring having a pair of cylinder-engaging flanges 14. In this instance, the flanges 14 are parallel to each other and are continuous and imperforate throughout their length. The flanges 14 are connected at their inner peripheries by a web, indicated generally at 15. In the present instance, the web 15 comprises a reverse bend 16 and a portion 17 projecting outwardly in the space between the flanges 14. The portion 17 may be rounded or generally circular in cross section, as will be apparent in Figs. 2 and 3.

To give the ring any desired flexibility, apertures 20 may be punched in the outwardly bent portion 17, preferably along the center line thereof. The apertures 20 may be of any desired shape, size and spacing to remove as much metal from the web 15 as is necessary to give the desired flexibility. In the present instance, the apertures 20 are round in form.

In the modified forms shown in Figs. 4 and 6, the flanges formed by bending the strips of metal along longitudinal lines are in non-parallel relation to each other, and are adapted to permit some flexing thereof relative to each other in operation. Thus, as shown in Figs. 4 and 5, the flanges indicated at 21 diverge from each other and may contact the piston at the corners formed by the side surfaces of the groove 10 and the peripheral surface of the piston. The web, indicated generally in this instance at 22 and connecting the inner peripheries of the flanges 21, comprises reversely bent portions 23 and outwardly extending portions connected by an axially extending portion 25. The portions 24 are positioned at such an angle that they diverge from one another but converge toward the adjacent flanges 21. The portion 25 thus has substantial axial height or width and is herein shown as being flat on its radial faces.

To provide the desired flexibility to the ring as a whole, holes 27 of any desired shape, size and spacing may be punched in portion 25 to provide for flexing of the flanges 21 relative to each other, metal is removed from the web portion by grinding or otherwise removing a portion of the bends 23, as indicated at 26, to reduce the thickness thereof, the metal being removed throughout an annular area at the inner periphery of the bends 23. To prevent excessive flexure of the flanges 21 during operation, the web 22, and particularly the bends connecting the portions 24 and 25 thereof, provide stops which limit the flexing of the flanges 21 toward each other.

Figure 7:
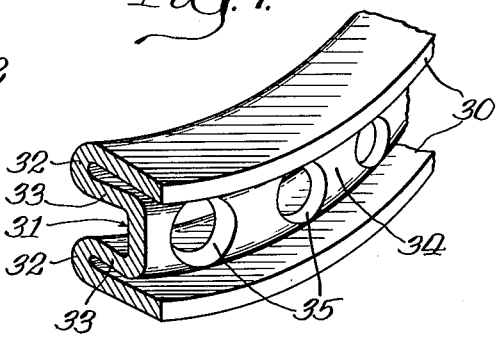
Fig. 7 is a fragmentary perspective view of the ring shown in Fig. 6.

In the form of ring shown in Figs. 6 and 7, the flanges, indicated at 30, converge toward each other and may be held by the web portion in contact with the side walls of the groove 10 adjacent the inner peripheries of the flanges 30. The web, indicated in this instance at 31, comprises reverse bends 32 at the inner peripheries of the flanges 30, outwardly extending portions 33, and an axially extending portion 34 connecting the outwardly extending portions 33. The portions 33, as in the case of the previously described form, diverge from each other but are convergent with the respective flanges 30.

While flexure of the flanges 30 in this instance might be provided for in a manner similar to that shown in the structure of Fig. 4, I have illustrated in Figs. 6 and 7 a weakening effect by means of apertures 35 punched in the portion 34 of the web 31. By thus weakening the portion 34 of the web, the flanges 30 may flex toward each other, the movement of flexure including in this instance the outwardly extending portions 33 since the flexure will occur within the portion 34. The apertures 35 also provide some flexibility for the ring as a whole.

Figure 8:
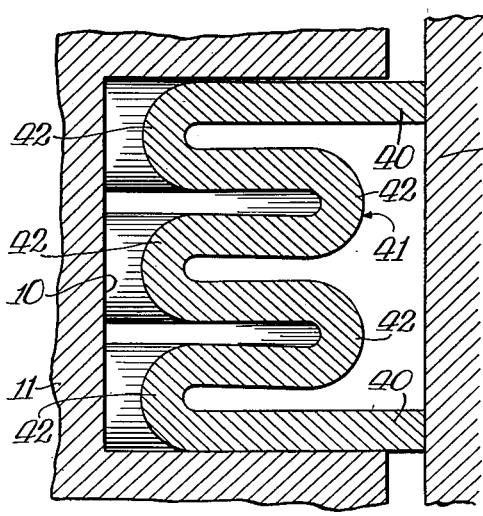
Fig. 8 is a view similar to Figs. 2, 4 and 6 but showing still another modified form of ring.
Figure 9:
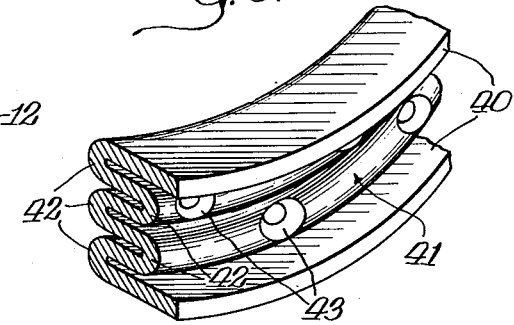
Fig. 9 is a fragmentary perspective view of the ring shown in Fig. 8.

The ring shown in Figs. 8 and 9 is constructed to provide a high tension, that is, the ring in this form is stiffened. This ring is similar to the ring shown in Fig. 2 in respect to the fact that its flanges 40 are parallel to each other. The inner peripheries of the flanges 40 are connected by a web, indicated generally at 41, formed to give the desired stiffness to the ring. To this end, the web 41 comprises a plurality of sinuous bends or folds 42 to provide a relatively large amount of metal between the flanges 40 and connecting them. The web 41, as is apparent, may be likened to accordion pleats, and provides a relative large amount of material in small space. Apertures 43 may be punched in the outer folds 42 of any desired size, shape, and spacing. The apertures 43 may also be in staggered relation in the respective folds 42 or may be aligned if desired.

From the foregoing description, it will be apparent that each of the forms of rings disclosed herein is relatively simple to manufacture since it is made from a strip of sheet metal folded along longitudinal lines and then arcuately bent into ring form. In all instances, the flanges are imperforate and continuous except for the gap 13, and are connected by webs formed in a number of different ways to give any desired tension to the ring.

I claim:

1. A piston ring comprising a single strip of sheet metal, having a channel shape cross-section with the flanges of the channel providing axially spaced cylinder-engaging edges, each flange being flat so that it lies in a single plane and being continuous and imperforate throughout its entire area except for a gap between the ends of the ring, the web portion of the channel being bent outwardly between the flanges throughout the circumferential length of the ring to stiffen the ring.

2. A piston ring comprising a strip of sheet metal bent along longitudinal lines to provide a pair of axially spaced flat cylinder-engaging flanges and a connecting web portion, the strip being arcuately bent to form the ring and having a gap between the ends of the ring, said flanges being imperforate for the full radial width of the ring, and the web portion being bent outwardly into the space between the flanges with a uniform cross-sectional contour throughout the circumferential length of the ring.

3. A sheet metal piston ring comprising a pair of axially and uniformly spaced flat cylinder-engaging flanges imperforate except for a gap between the ends of the ring and integrally connected at their inner periphery by a bent portion extending axially from said inner periphery and radially outward within the space between said flanges, said bent portion having a uniform cross-sectional contour and being structurally weakened by removal of metal only from its outwardly extending portion to increase the flexibility of the ring.

4. A sheet metal piston ring comprising a pair of axially and uniformly spaced flat cylinder-engaging flanges imperforate except for a gap between the ends of the ring and integrally connected at their inner periphery by a bent portion extending axially from said inner periphery and radially outward within the space between said flanges, said bent portion being perforated only in its outwardly extending area to increase the flexibility of the ring.

5. A sheet metal piston ring comprising a pair of axially spaced cylinder-engaging flanges imperforate throughout their entire area except for a gap between the ends of the ring and integrally connected at their inner periphery by a web bent outwardly to extend adjacent the flanges and then extending axially in the space between the flanges, the axially extending portion being perforated to increase the flexibility of the ring, said web being uniformly positioned relative to the flanges throughout the circumferential length of the ring.

6. A sheet metal piston ring comprising a pair of axially spaced flat cylinder-engaging flanges connected at their inner periphery by a web bent outwardly to extend adjacent the flanges in the space therebetween and then extending axially in a uniform relation to the flanges throughout the circumferential length of the ring, the ring being perforated only in said axially extending portion of the web, except for a gap between the ends.

7. A piston ring comprising a single strip of sheet metal bent along longitudinal lines and arcuately to provide a ring having a gap between its ends and comprising a pair of axially spaced flat flanges imperforate throughout their entire area except for said gap and connected at their inner peripheries by a web extending into the space between the flanges, said web holding said flanges in uniformly spaced parallel relation to one another.

8. A piston ring comprising a strip of sheet metal bent along longitudinal lines and arcuately to provide a ring having a gap between its ends and comprising a pair of axially spaced imperforate flanges connected at their inner peripheries by a web extending into the space between the flanges, said web being so bent as to hold said flanges in non-parallel relation to one another.

9. A piston ring comprising a strip of sheet metal bent along longitudinal lines and arcuately to provide a ring having a gap between its ends and comprising a pair of axially spaced imperforate flanges connected at their inner peripheries by a web comprising portions extending generally radially adjacent and converging toward the respective flanges, and a portion connecting the outer ends of said first-mentioned portions and extending axially, the flanges being positioned by said web in non-parallel relation to each other.

10. A sheet metal piston ring comprising a pair of axially spaced imperforate cylinder-engaging flanges connected by a bent portion extending axially and outwardly between the flanges and tending to hold the flanges in non-parallel relation to each other, the bent portion being structurally weakened by removal of metal therefrom to permit the flanges to flex axially relative to each other.

11. A sheet metal piston ring comprising a pair of axially spaced imperforate cylinder-engaging flanges connected by a bent portion tending to hold the flanges in non-parallel relation to each other and structurally weakened to permit the flanges to flex axially relative to each other, said bent portion extending into the space between the flanges to limit the extent of flexing of the flanges.

12. A sheet metal piston ring comprising a pair of axially spaced imperforate cylinder-engaging flanges, and a perforated web portion, the latter being connected to the inner periphery of the flanges by reverse bends reduced in thickness by removal of metal around the inner periphery thereof to permit the flanges to flex axially relative to each other.

13. A sheet metal piston ring comprising a pair of axially spaced divergent imperforate cylinder-engaging flanges integrally connected at their inner periphery to a web comprising outwardly extending portions divergent from each other and convergent with the respective flanges, and an axially extending portion connecting the outwardly extending portions, the connections between said flanges and said outwardly extending portions being structurally weakened by reduction in thickness of the metal to permit said flanges to flex relative to each other during operation.

14. A sheet metal piston ring comprising a pair of axially spaced convergent imperforate cylinder-engaging flanges integrally connected at their inner periphery to a web comprising outwardly extending portions divergent from each other and convergent with the respective flanges, and an axially extending portion having a plurality of apertures therethrough to permit the flanges to flex relative to each other.

15. A sheet metal piston ring comprising a pair of axially spaced cylinder-engaging flanges integrally connected at their inner periphery by a web comprising a plurality of sinuous bends extending between the flanges.

16. A piston ring comprising a strip of sheet metal folded along longitudinal lines and bent arcuately to provide a gap between the ends, the folding of the strip providing a pair of axially spaced cylinder-engaging flanges and a plurality of integral folds extending outwardly between the flanges, the flanges being imperforate except for the gap.

RALPH R. TEETOR.

REFERENCES CITED

The following references are of record in the file of this patent:

UNITED STATES PATENTS

| Number | Name | Date |
|---|---|---|
| 2,239,376 | Smith | Apr. 22, 1941 |
| 2,273,691 | Bowers | Feb. 17, 1942 |
| 2,290,499 | Smith | July 21, 1942 |
| 2,317,580 | Bauer | Apr. 27, 1943 |
| 2,346,896 | Bowers | Apr. 18, 1944 |
| 2,397,636 | Zahodiakin | Apr. 2, 1946 |
| 2,404,862 | Phillips | July 30, 1946 |
| 2,452,503 | Teetor | Oct. 26, 1948 |
| 2,460,431 | Phillips | Feb. 1, 1949 |

FOREIGN PATENTS

| Number | Country | Date |
|---|---|---|
| 523,275 | Great Britain | July 10, 1940 |